United States Patent
Davis, Jr. et al.

(10) Patent No.: US 6,481,751 B1
(45) Date of Patent: *Nov. 19, 2002

(54) COMPRESSED NATURAL GAS TANK FOR VEHICLES

(76) Inventors: William F. Davis, Jr., 148 Auble St., Wadsworth, OH (US) 44281; James G. Carothers, Jr., 3850 Shellhart Rd., Norton, OH (US) 44203; William J. Bees, 503 McEntee Dr., Wadsworth, OH (US) 44281

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/833,641

(22) Filed: Apr. 8, 1997

Related U.S. Application Data

(63) Continuation of application No. 08/250,543, filed on May 27, 1994, now abandoned, which is a continuation of application No. 08/062,279, filed on May 17, 1993, now Pat. No. 5,443,578.

(51) Int. Cl.[7] .................................................. B60P 3/24
(52) U.S. Cl. ....................... 280/831; 180/69.5; 280/834
(58) Field of Search .................. 280/830, 831, 280/832, 833, 834, 837, 838, 79.6; 180/69.5, 311, 314; 137/206; 220/581, 588, 589

(56) References Cited

U.S. PATENT DOCUMENTS

| | | | | |
|---|---|---|---|---|
| 1,177,007 A | * | 3/1916 | Auerbacher | 280/834 |
| 1,860,531 A | * | 5/1932 | Eberhard | 280/834 |
| 3,163,434 A | * | 12/1964 | Krueger | 280/832 |
| 3,608,660 A | * | 9/1971 | Smith | 180/69.5 |
| 4,143,193 A | * | 3/1979 | Rees | 280/834 |
| 5,150,812 A | * | 9/1992 | Adams | 220/414 |
| 5,174,622 A | * | 12/1992 | Gutta | 180/210 X |
| 5,370,418 A | * | 12/1994 | Pugh | 280/830 |
| 5,443,578 A | * | 8/1995 | Davis, Jr. | 280/834 |
| 5,476,189 A | * | 12/1995 | Duvall et al. | 220/590 |
| 5,658,013 A | * | 8/1997 | Bees et al. | 280/831 |

* cited by examiner

*Primary Examiner*—Anne Marie Boehler
(74) *Attorney, Agent, or Firm*—Renner, Kenner, Greive, Bobak, Taylor & Weber

(57) ABSTRACT

A compressed natural gas fuel tank for vehicles employing internal combustion engines. A fuel tank of heavy gauge metal is interposed within the vehicle frame as an integral portion thereof. Overlay channel members are welded or otherwise affixed to the tank and then welded or otherwise affixed to the side rails or channel members of the vehicle frame. The tank, of heavy gauge metal and non-circular cross section, is also welded or otherwise appropriately affixed to the vehicle floor. The tank is capable of receiving natural gas at high pressure levels, while also serving structurally as a frame element, providing continuity of the side rail members of the frame, while also serving to further interconnect the vehicle floor with the side rails. Also presented are tank assemblies in which a tank housing receives a plurality of cylindrical pressure tanks of composite material construction. The cylindrical tanks are nested within the tank housing, which also serves as an integral part of the vehicle frame. A manifold with inlet and outlet valves interconnects the cylindrical tanks.

13 Claims, 4 Drawing Sheets

COMPRESSED NATURAL GAS TANK FOR VEHICLES

CROSS REFERENCED TO RELATED APPLICATIONS

This is a continuation of application Ser. No. 08/250,543, filed May 27, 1994 now abandoned, which is a continuation of application Ser. No. 08/062,279 filed May 17, 1993 now U.S. Pat. No. 5,443,578.

TECHNICAL FIELD

The invention herein resides in the art of automotive vehicles and, more particularly, of the type driven by a fuel powered engine. Specifically, the invention relates to a fuel tank for receiving and maintaining compressed natural gas as the fuel for such a vehicle.

BACKGROUND ART

Modern transportation requires the extensive use of over-the-road vehicles such as automobiles, vans, trucks, and the like. Presently, such vehicles are powered by an engine which is fueled by gasoline or diesel fuel. The use of such fuels has given rise to two apparent shortcomings. First, such fuels are in limited supply throughout the world and the international control of such fuels causes their price and availability to be uncertain. A second shortcoming of such fuels is their adverse impact on the environment. It is generally believed that the hydrocarbon gases released from the combustion of gasoline or diesel fuel in an internal combustion engine is environmentally undesirable.

It is known that natural gas is in bountiful supply in the United States and that the burning of such gas is environmentally compatible. It is also known that internal combustion engines can operate efficiently on natural gas. However, the use of natural gas as a vehicle fuel has been constrained by the "range" afforded the vehicle using such fuel. In the past, tanks of compressed natural gas have been placed in the trunk or other cargo carrying areas of the vehicle and interconnected with the fuel system for passage to fuel injectors or the like. However, the availability of storage areas in vehicles suitable for receiving such tanks of compressed natural gas is somewhat limited and such limitation necessarily constrains the distance that the vehicle can travel without refueling. Accordingly, the range of vehicles employing natural gas fuel has necessarily been significantly limited in the past.

The prior art has been substantially devoid of the presentation of a vehicle having an internal combustion engine and having fuel tanks provided as an integral portion of the vehicle to serve for holding natural gas fuel for use by the engine. The requirement that the natural gas be introduced into the fuel tanks at high levels of pressure have typically dictated that the tanks be specially designed for simple retention in storage areas of the vehicle, and the prior art has not envisioned a manner for incorporating fuel tanks as a structural portion of the vehicle itself. Indeed, fuel tanks of sufficient strength to receive and maintain large volumes of natural gas at high pressure levels while serving as a structural element of the vehicle are not known. Indeed, the prior art has envisioned the use of natural gas as the fuel for vehicles as being more of a novelty feature for use by vehicle fleets serving a limited area, rather than as a practical means for avoiding the shortcomings inherent in the use of gasoline and diesel fuels.

In the above referenced copending application Ser. No. 08/062,279, filed May 17, 1993, a single steel tank of rectangular construction was presented. That concept is set forth in FIGS. 1–5, herein. While such a tank assembly is quite suitable for its intended purposes, its rectangular configuration dictates substantial wall thickness to maintain the contemplated pressures. Such results in unnecessary cost and weight for the tank assembly and vehicle as a whole.

DISCLOSURE OF INVENTION

In light of the foregoing, it is a first aspect of the invention to provide a compressed natural gas fuel tank for vehicles providing significantly extended capacity over prior art tanks.

Another aspect of the invention is the provision of a compressed natural gas fuel tank for vehicles in which the tank is formed as an integral and structural element of the vehicle frame.

Yet another aspect of the invention is the provision of a compressed natural gas fuel tank for vehicles which is capable of receiving and maintaining large volumes of natural gas at high pressure levels.

Still a further aspect of the invention is the provision of a compressed natural gas fuel tank for vehicles which can be positioned and maintained beneath the vehicle, in an unobtrusive and safe manner.

Still a further aspect of the invention is the provision of a compressed natural gas fuel tank for vehicles which is easy to construct and conducive to implementation with presently existing vehicles by retrofitting the same, and to new vehicles as a new assembly.

An additional aspect of the invention is to provide a compressed natural gas fuel tank for vehicles wherein a plurality of high pressure tanks are maintained within a tank housing which forms an integral and structural element of the vehicle frame.

Still a further aspect of the invention is to provide a compressed natural gas fuel tank for vehicles wherein a plurality of high pressure tanks are interconnected with a common manifold and maintained within a tank housing forming a structural element of the vehicle frame.

Another aspect of the invention is the provision of a compressed natural gas fuel tank for vehicles wherein a plurality of high pressure tanks constructed of composite material may be received in a tank housing forming a portion of the vehicle frame, and wherein a weight savings is realized over such a fuel tank formed of rectangular steel construction.

The foregoing and other aspects of the invention which will become apparent as the detailed description proceeds are achieved by a compressed natural gas fuel tank assembly for a vehicle, comprising: a tank housing having a plurality of cylindrical pressure tanks therein; first means extending from said tank housing for engaging a side rail of the vehicle; and second means interengaging said tank housing and a floor of the vehicle for securing said tank housing to said floor.

Other aspect of the invention which will become apparent herein are achieved by a compressed gas fuel tank assembly for a vehicle, comprising: a tank housing positioned within a discontinuity in a side rail of a frame of a vehicle, said tank housing maintaining a plurality of pressure tanks therein; channel members extending from opposite ends of the tank housing and being securedly engaged to respective ends of said side rail on opposite sides of said discontinuity; and means securing said tank housing to a floor of the vehicle.

DESCRIPTION OF DRAWINGS

For a complete understanding of the objects, techniques, and structure of the invention, reference should be made to the following detailed description and accompanying drawings wherein.

BEST MODE FOR CARRYING OUT THE INVENTION

Figure 1:
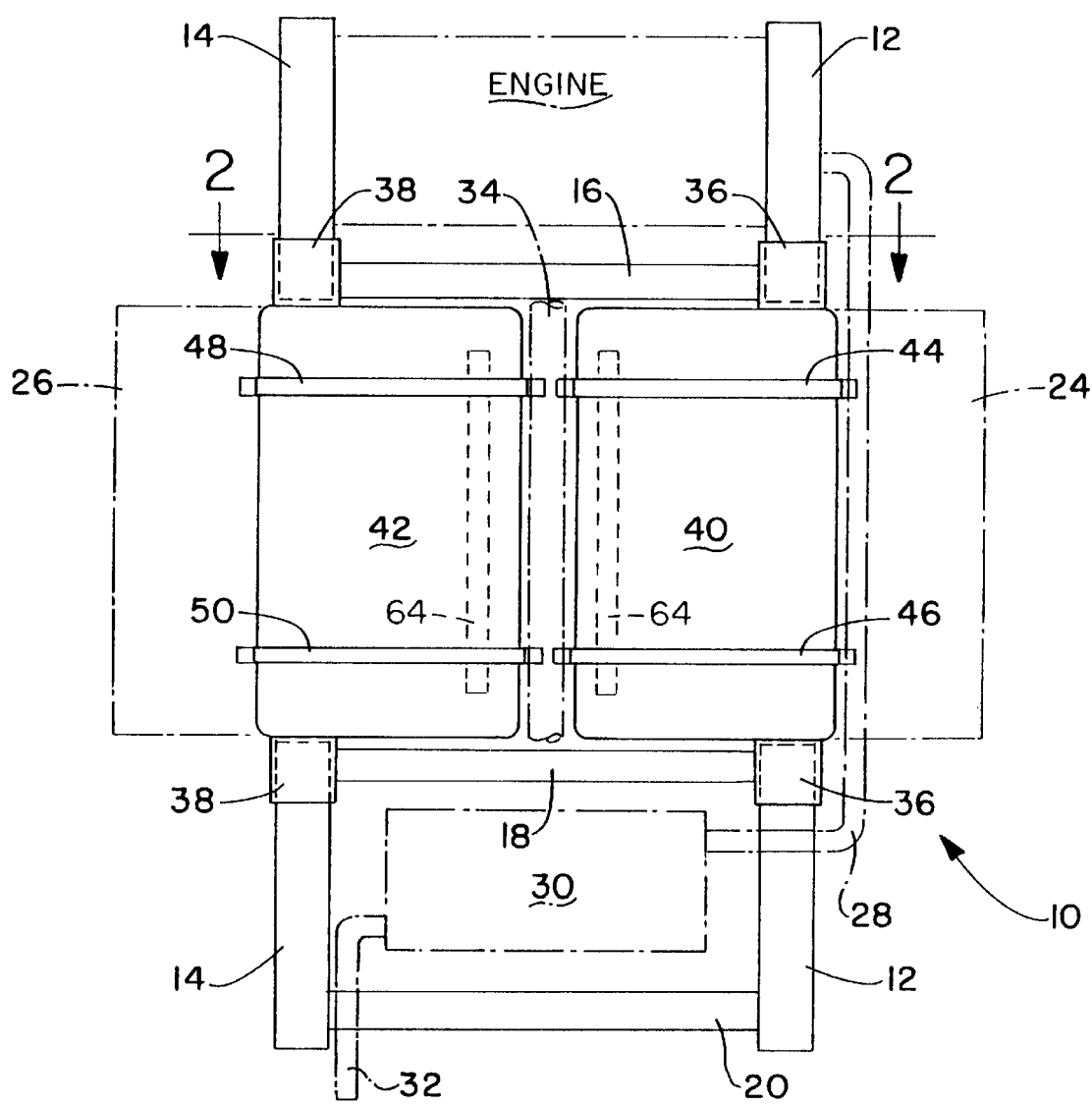
FIG. 1 is bottom plan view of a rear-wheel-drive vehicle showing the natural gas fuel tank of the invention.

Referring now to the drawings and more particularly FIG. 1, it can be seen that a vehicle frame of the rear-wheel-drive type is designated generally by the numeral 10. The frame 10 includes a pair of side rails or members 12, 14 which are interconnected by spaced apart laterally extending cross members 16, 18, 20. Right and left step wells 24, 26 may be provided along each side of the vehicle frame 10 in standard fashion. Also included as a portion of a typical vehicle is an exhaust pipe 28 extending along a side of the frame 10 to interconnect with a muffler 30 from which extends a tailpipe 32. In somewhat standard fashion in a rear-wheel-drive vehicle, a drive shaft 34 extends centrally along the bottom of the frame 10 between a transmission and a differential assembly.

According to the invention, a pair of fuel tanks 40, 42 are fixed beneath the vehicle frame 10 and caused to be an integral portion thereof In the preferred embodiment of the invention, the tanks 40, 42 are of steel construction, having a thickness on the order of 0.5–1.0 inch. The tanks are rigidly constructed to withstand an internal pressure of the compressed natural gas on the order of 2,000–3,000 psi, and preferably 2,400 psi.

Figure 2:
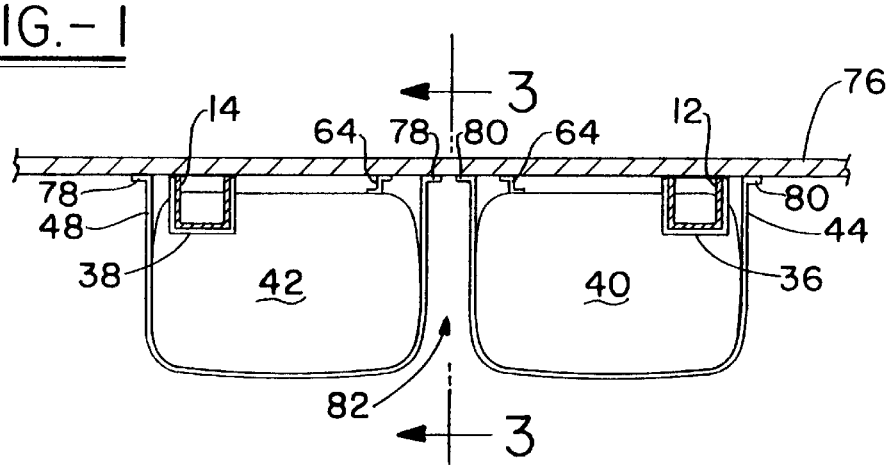
FIG. 2 is an end elevational view, in partial section, taken along the line 2—2 of FIG. 1.
Figure 3:
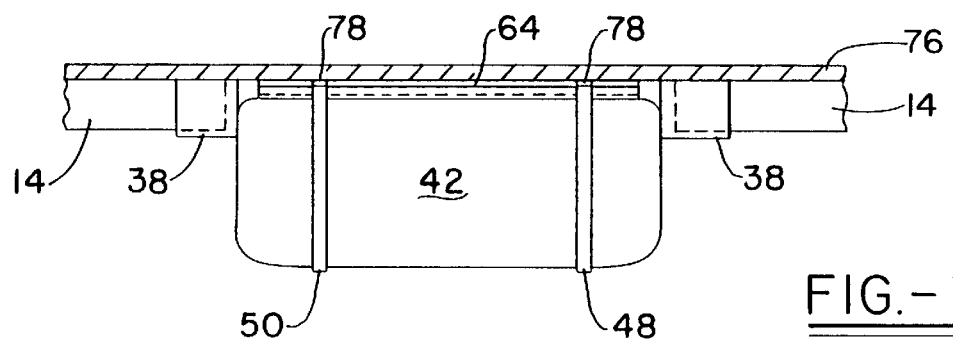
FIG. 3 is a side elevational view, in partial section, taken along the line 3—3 of FIG. 2.

In a standard vehicle construction, each of the side rails or members 12, 14 would be of continuous length. However, according to the instant invention, the side rails 12, 14 are removed at the area receiving the tanks 40, 42, and are structurally replaced by the tanks themselves. As shown in FIGS. 1–3, the overlay frame channel members 36 are welded to or otherwise formed as an integral portion of the tank 40, while the overlay frame channel members 38 are similarly made as an integral portion of the tank 42. The overlay channel members 36, 38 are then received upon respective end portions of the side rails or frame members 12, 14 and welded thereto. In a preferred embodiment of the invention, only horizontal welds are made, to provide appropriate integrity and to prevent crystallization of the weld joints. However, the actual welding and affixing of the frame overlay channel members 36, 38 to the frame members 12, 14 and tanks 40, 42 would be readily perceived and appreciated by those skilled in the art.

It will be appreciated that the instant invention contemplates the channel members 36, 38 receiving the side rails or frame members 12, 14 therein, as shown in the drawings. However, it is also envisioned that the channel members 36, 38 may be received within the channels defined by the side rails 12, 14. In either event, it will be understood by those skilled in the art that the continuous extension of the side rails 12, 14 is effected by the interpositioning of respective tanks 40, 42 which, through the provision of the frame overlay channel members 36, 38, attains side rail construction which is continuous and integral with the tanks 40, 42. Of course, the extent of overlap between the members 36, 38 and the respective side rails 12, 14 determines, to some degree, the overall integrity of the frame assembly 10.

If necessary, the junction of the overlap between the channel members 36, 38 and side rails 12, 14 may be further strengthened by implementing a plate bridging the junction and being affixed to each of the associated channel members 36, 38 and side rails 12, 14. It has been found that a metal stock plate having a thickness on the order of 0.25 inch may be bolted or otherwise secured over the junction for such purposes. Those skilled in the art will appreciate that the side rails 12, 14 are fabricated of steel and have a thickness of approximately 0.125 inch and, accordingly, the channel members 36, 38 are preferably constructed of similar material.

Also presented as a portion of the invention, and adding additional support to the tanks, are straps 44, 46, 48, 50 which are secured to the floor 76 of the vehicle. As shown in FIG. 2, the strap 44 is provided with legs or flanges 80 at the ends thereof, while legs or flanges 78 are provided at the ends of the straps 48. Of course, the straps 46, 50 would have similar flanges at their ends. The flanges 78, 80 may be welded, bolted, or otherwise affixed to the floor 76 of the vehicle, providing further support to the tanks 40, 42.

With further attention to FIGS. 2 and 3, it can be seen that an angle iron 64 is welded or otherwise appropriately attached along the length of each of the respective tanks 40, 42 and is also welded or otherwise appropriately attached to the floor 76. Those skilled in the art will now readily appreciate that the compressed natural gas tanks 40, 42 are not only rendered as an integral portion of the side rails or members 12, 14, but are also rendered as an integral portion of the floor 76, as well. Accordingly, although the side rails or members 12, 14 appear to be discontinuous as a result of the insertion of the tanks 40, 42, the presence of the tanks 40, 42, made of heavy gauge metal as aforesaid, provides increased strength and integrity to the vehicle frame 10.

It is further presented that the tanks 12, 14 are preferably of non-circular cross section. By providing such tanks with a substantially rectangular cross section, the volume of the tanks is maximized for given dimensional constraints without sacrificing strength or rigidity. In the preferred embodiment, the edges of the tanks are rounded, as shown.

Figure 4:
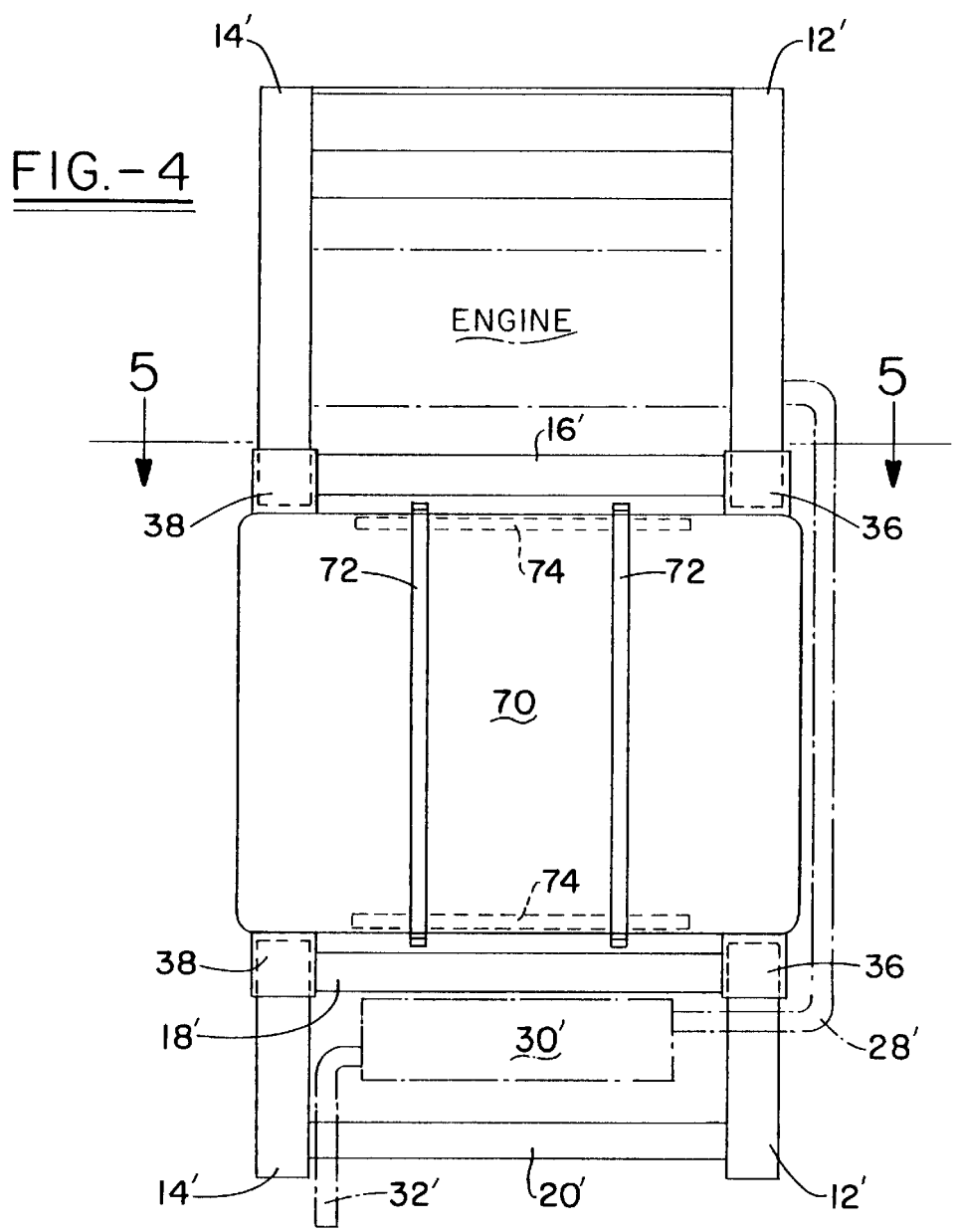
FIG. 4 is a bottom plan view of a front-wheel drive vehicle showing the implementation of the natural gas fuel tank of the invention.
Figure 5:
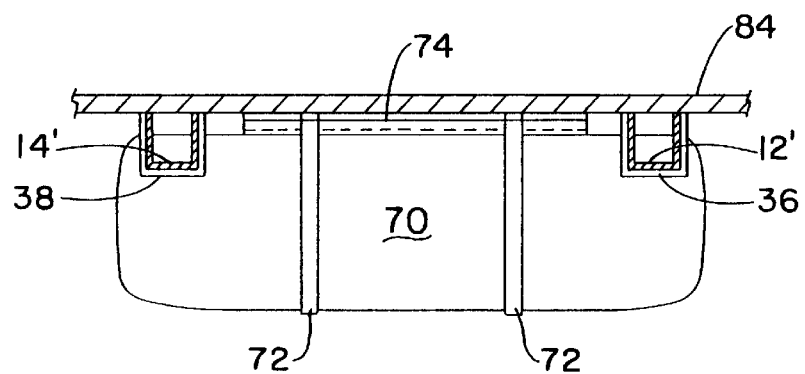
FIG. 5 is an end elevational view, in partial section, of the embodiment shown in FIG. 4 taken along the line 5—5.

With reference now to FIGS. 4 and 5, it can be seen that the concept of the invention can be readily implemented with front-wheel-drive vehicles. Here, vehicle frame side rails or members 12', 14' are interconnected with cross members 16', 18', 20', with an exhaust pipe 28', muffle 30', and tailpipe 32' provided in ordinary fashion. Since no drive shaft is required for the front wheel drive vehicle, a single fuel tank 70, of substantial size, can be employed. Again, in the preferred embodiment of the invention the structure of the tank 70 would be similar to that of the tanks 40, 42, using substantially the same materials, welding techniques, and the like to assure the necessary structural integrity and ability to withstand the pressures aforesaid.

As shown in FIGS. 4 and 5, frame overlay channel members 36, 38 are again welded to the tank 70 and to respective side rail members 12, 14. In this instance, the tank 70 not only provides for a continuity of the respective side rail member 12, 14, but also serves to interconnect them as well. Additionally, straps 72 are affixed to the floor 84 of the vehicle as by welding, bolting, or the like, and also serve to provide vertical support for the tank 20. Also included are angle irons 74 traversing center portions fore and aft of the tank 70, the same being welded to both the tank 70 and to the floor 84. Accordingly, the tank 70 is an integral portion of not only the side rails 12, 14 of the frame, but also provides strength and rigidity to the floor 84, further interconnecting the floor 84 with the remainder of the vehicle frame.

As presented above, the frame overlay channel members 36, 38 may be of such nature as to receive the respective ends of the side rails 12', 14', or they may be so configured as to be received within the channels of the side rails 12', 14'. Both concepts are envisioned as a portion of the instant invention.

Those skilled in the art will readily appreciate that the instant invention may be applied to preexisting vehicles, as well as new ones. In the event that an existing vehicle is to be converted for use of natural gas, the old gas tank may be removed, the side rails or members 12, 14 removed at appropriate areas, and the appropriate tank 70 or tanks 40, 42 be placed beneath the vehicle frame 10 and secured to the side rails 12, 14 or 12', 14' as discussed above. For implementation with new vehicle manufacture, it is contemplated that the side rails 12, 14 and 12', 14' will be manufactured with the appropriate spacing therebetween to receive the appropriate tanks and frame overlay channel members 36, 38 as just presented.

By manufacturing the tanks of the heavy gauge metal as mentioned above, the tanks serve not only as frame members for the vehicle, but are also of sufficient strength to accept large volumes of natural gas at high pressures, while also being resistant to impacts from crashes or the like. Accordingly, the instant invention provides for structural vehicle integrity, enhanced safety, environmental compatibility, and economy in the operation of a vehicle powered by an internal combustion engine.

While the fuel tanks described above with respect to FIGS. 1–5 are suitable for receipt of compressed natural gas for use in a vehicle, it is generally understood that circular, rather than rectangular, cross sections are best suited for pressure vessels. It is similarly known by those skilled in the art that wall thicknesses can generally be reduced for pressure vessels having circular cross sections as compared to those having rectangular cross sections. Accordingly, a reduction in material weight, and cost can be achieved by maintaining the compressed natural gas of the instant invention in tanks of circular cross section rather than those having a rectangular cross section as presented above. Such fuel tank assemblies are presented and discussed hereinafter with respect to FIGS. 6–10.

Figure 6:
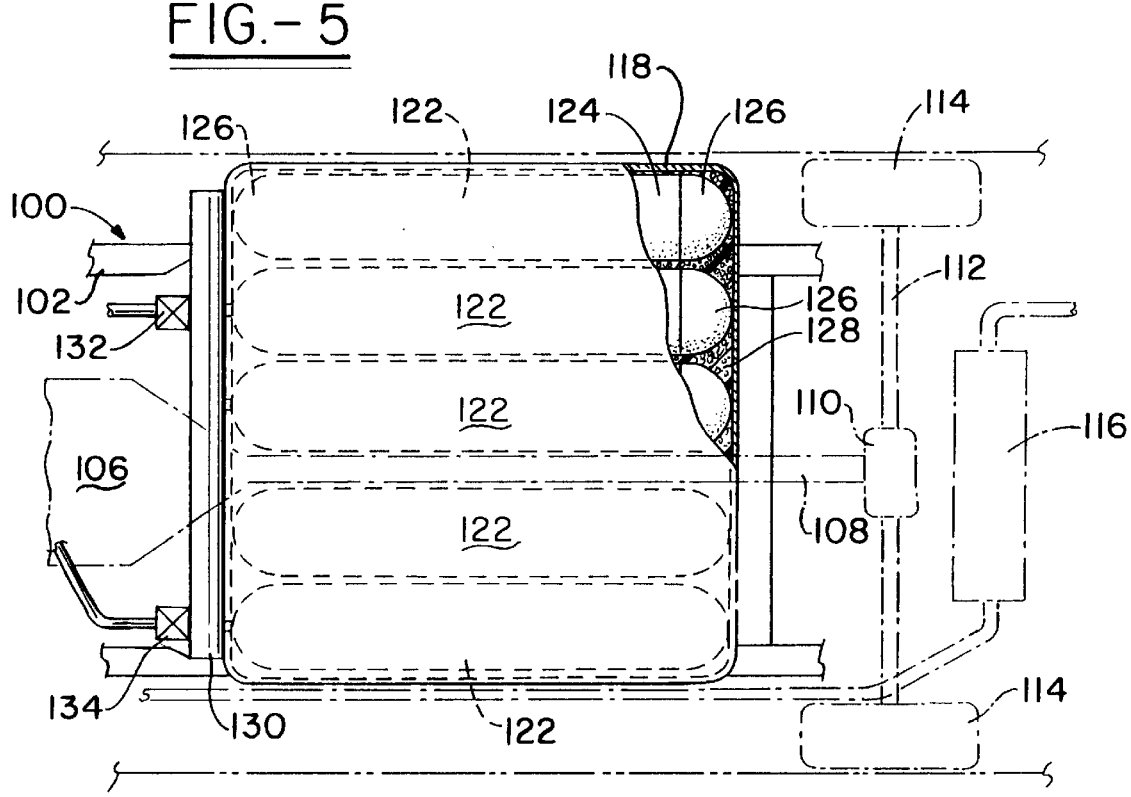
FIG. 6 is a top plan illustrative view of an embodiment of the invention wherein a plurality of cylindrical composite tanks are maintained in a single tank housing of a rear wheel drive vehicle.
Figure 7:
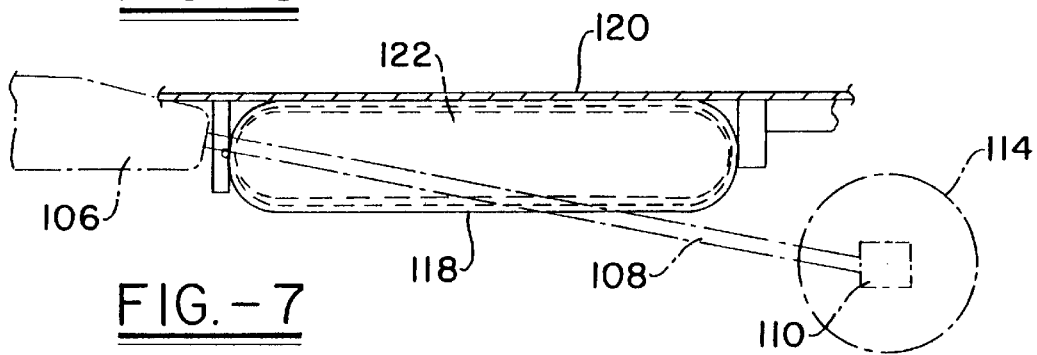
FIG. 7 is a side elevational view of the embodiment shown in FIG. 6.

As shown in FIGS. 6 and 7, a vehicle frame for a rear wheel drive vehicle is designated generally by the numeral 100. As presented above with respect to FIGS. 1–5, the vehicle frame 100 includes appropriate side rails or members 102, 104 with necessary cross members as is well understood and appreciated by those skilled in the art. In the embodiment of FIGS. 6 and 7, the engine 106 is interconnected by means of a drive shaft 108 to a differential 110 at the rear of the vehicle. The axle 112 extends from the differential 110 into driving interconnection with the rear drive wheels 114. Of course, an appropriate muffler 116 and other portions of the exhaust system and the like are maintained beneath the vehicle as shown According to the invention, a fuel tank housing 118 of steel or other suitable construction is mounted in identical fashion to the fuel tanks described above with respect to FIGS. 1–5. In other words, the fuel tank housing 118 becomes an integral portion of the vehicle frame and interconnects with the side rails or members 102, 104 as previously discussed. It will, of course, be appreciated that with the drive shaft 108 passing from the engine 106 to the differential 110, and with the fuel tank housing 118 being interposed therebetween, accommodation must be made for passage of the drive shaft 108. In this regard, either dual tanks may be provided as described above with respect to FIGS. 1 and 2, or the fuel tank housing 118 may be configured with an appropriate recess or the like to accomodate passage of the drive shaft 108. In any event, the fuel tank housing (or housings) 118 interconnect with the frame members 102, 104 and is appropriately welded or otherwise interconnected and affixed to the vehicle floor 120 as earlier presented herein.

The compressed natural gas used in association with the fuel tank housing 118 is not received within the housing itself, but instead within a plurality of cylindrical tanks 122. Each of the tanks 122 has a cylindrical body member 124 and hemispherical end caps 126. Accordingly, for any given wall thickness, the strength of the cylindrical tanks 122 is greatly enhanced over that of a fuel tank having a rectangular cross section as discussed above.

The cylindrical tanks 122 are preferably constructed of a composite material as commonly used for pressure vessels. Such are sufficient to maintain the pressure presented above. Fiber reinforced composite materials such as graphite, carbon, or boron composites are suitable for implementation with the instant invention. Similarly, filament wound structures as presently employed as pressure vessels would also suffice. Fiber reinforced plastics such as fiberglass would, indeed, provide sufficient strength to accomodate the high pressures necessary in a compressed natural gas fuel tank. Indeed, the composite KEVLAR (Trademark of Dupont) is also suitable for such purposes.

The cylindrical tanks 122 are preferably nested or otherwise retained within the fuel tank housing 118. In a preferred embodiment, a foam nest 128 may be provided to receive and maintain the cylindrical tanks 122. The foam nest 128 may be blown in situ, molded or otherwise formed as clam shell halves, or may simply comprise spaced bands having troughs for receiving and securing the tanks 122 in place.

An appropriate manifold 130 is provided in interconnection with each of the cylindrical tanks 122. Accordingly, a single inlet valve 132 may be interconnected with the manifold for charging the cylindrical tanks 122, while a single outlet valve 134 may be interconnected with the manifold to pass the natural gas to the engine 106.

Figure 8:
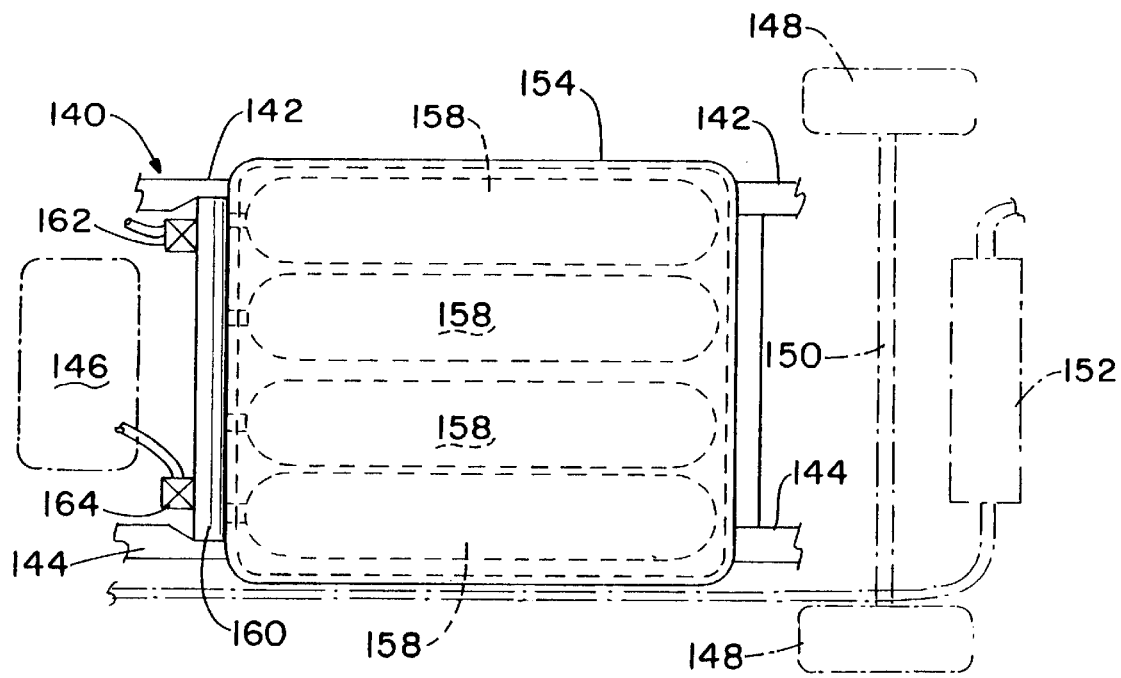
FIG. 8 is a top plan illustrative view of another embodiment of the invention similar to FIG. 6 as applied to a front wheel drive vehicle.
Figure 9:
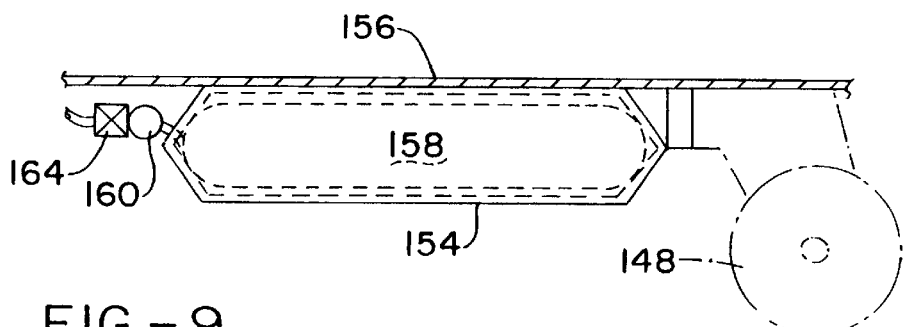
FIG. 9 is a side elevational view of the embodiment shown in FIG. 8.

As shown in FIGS. 8 and 9, the concept of a fuel tank housing retaining a plurality of high pressure tanks of cylindrical composite construction may also be employed in a front wheel drive vehicle. The frame for such a vehicle is designated generally by the numeral 140, and the same is again shown as including side rails or members 142, 144 and appropriate cross members as required. The engine 146 is connected through an appropriate transaxle or the like to drive the front wheels (not shown). Again, rear wheels 148 are mounted upon opposite ends of the rear axle 150, with a muffler and appropriate exhaust system 152 also being provided beneath the vehicle.

As with the embodiment of FIGS. 6 and 7, a fuel tank housing 154 of steel construction is mounted in a manner similar to that described above with respect to FIGS. 1–7 so as to comprise an integral part of the vehicle frame by interconnection with the side rail members 142, 144 and by welding or other appropriate fixing to the floor 156. Cylindrical high pressure tanks 158 of appropriate composite material as discussed above are maintained within the fuel tank housing 154 and are interconnected with each other by an appropriate manifold 160. As with the embodiment of FIGS. 6 and 7, an appropriate inlet valve 162 allows for the charging of the cylindrical tanks 158, while a single outlet valve 164 provides for passage of the gas from the tanks 158 to the engine 146. Of course, the valves 162, 164 are interconnected with the manifold 160.

It will be appreciated that, in the case of a front wheel drive vehicle, a single fuel tank housing 154 may house all of the cylindrical tanks 158, and no configuring of the fuel tanks housing 154 is necessary to accomodate the drive shaft.

Figure 10:
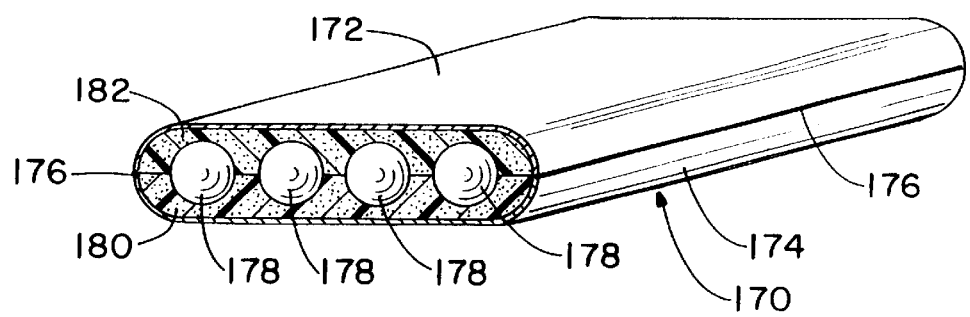
FIG. 10 is a perspective view, partially broken away, of the tank assembly of FIGS. 8 and 9, showing the nesting of the cylindrical composite tanks within a molded foam receptacle.

With reference now to FIG. 10, it can be seen that a fuel tank assembly of the type employed in the embodiments of FIGS. 6–9 is designated generally by the numeral 170. As shown, tank halves 172, 174 of a clam shell design are configured to receive a plurality of composite tanks 178 therein and then to be closed by means of an appropriate weldment 176 extending about the periphery of the tank assembly. The composite tanks 178 are of the nature described above, having a cylindrical mid section with hemispherical end caps. Those skilled in the art will appreciate that the manifolds 130, 160 are interconnected with the composite tanks 178 at the hemispherical end portions because for a common tank thickness the stresses at the hemispherical end are typically one half the stresses imparted to the cylindrical tank portion interposed therebetween. Accordingly, any intrusion into the tank has significantly less structural impact upon the integrity of the tank at the hemispherical end sections than it would at the cylindrical body portion.

The composite tanks 178 are, as presented above, received in foam nests 180, 182 as shown. In a preferred embodiment, the foam nests are of styrofoam, but may be of any suitable foam or shock absorbing material. As presented above, the foam nests may be blown in situ, or may be premolded to be received in the respective tank halves 172, 174 while nestingly receiving the composite tanks 178. Alternatively, the foam nests 180, 182 may comprise a plurality of spaced molded foam bands adapted to be received by the respective tank halves 172, 174 and the composite tanks 178.

Those skilled in the art will readily appreciate that use of high pressure cylindrical composite tanks such as the tanks 122, 158, 178 discussed above, allows for the fuel tank housings 118, 154, and 172, 174 to be made of a substantially thinner gauge steel than in the embodiments of FIGS. 1–5. Indeed, such fuel tank housings may be fabricated of steel having a thickness on the order of 8–11 gauge, and most preferably 11 gauge. Such steel, having a thickness on the order of 0.125 inch is quite suitable for providing the structural integrity to the vehicle frame by comprising an integral portion of the frame itself, while also receiving and retaining the pressurized cylindrical tanks receiving the compressed natural gas. The result is a reduction in weight, material costs, and enhanced product reliability and durability.

Thus it can be seen that the objects of the invention have been satisfied by the structure presented above. While in accordance with the patent statutes only the best mode and preferred embodiments of the invention have been presented and described in detail, it is to be understood that the invention is not limited thereto or thereby. Accordingly, for an appreciation of the true scope and breadth of the invention, reference should be made to the following claims.

What is claimed is:

1. The combination of a compressed natural gas fuel tank assembly and a vehicle having a pair of oppositely disposed side rails, comprising:
   a tank housing having opposite ends and a plurality of cylindrical pressure tanks therein; and
   a pair of channel members extending from opposite ends of said tank housing, each of said channel members engaging a respectively associated one of said side rails.

2. The combination according to claim 1 wherein said side rails are discontinuous, and wherein said tank housing and said channel members comprise a continuation of said side rails where said side rails are discontinuous.

3. The combination according to claim 1, wherein said cylindrical pressure tanks are constructed of a fiber reinforced composite material.

4. The combination according to claim 1, further comprising means for securing said cylindrical pressure tanks within said tank housing.

5. The combination according to claim 1, further comprising means for securing said cylindrical pressure tanks within said tank housing.

6. The combination according to claim 5, wherein said means for securing comprises a foam member interposed between said cylindrical tanks and said tank housing.

7. The combination according to claim 6, wherein said foam member nestingly receives said cylindrical tanks.

8. The combination according to claim 1, wherein said tank housing is of generally rectangular cross section and is constructed of 8–11 gauge steel.

9. A compressed gas fuel tank assembly in combination with a vehicle, comprising:
   a tank housing positioned within a discontinuity in a side rail of a frame of said vehicle, said discontinuity defining respective ends of said side rail, said tank housing having a pair of opposite ends and maintaining a plurality of pressure tanks therein;
   channel members extending from said opposite ends of said tank housing and being securedly engaged to said respective ends of said side rail; and
   a manifold interconnecting said plurality of cylindrical pressure tanks, said manifold having valve means for passing gas to and from said pressure tanks.

10. The compressed natural gas tank assembly for a vehicle according to claim 9, wherein said pressure tanks are cylindrical and fabricated from a fiber reinforced composite material.

11. The compressed natural gas tank assembly for a vehicle according to claim 10, wherein said pressure tanks are nestingly received within said tank housing.

12. In combination, a compressed gas fuel tank assembly and a vehicle, comprising:

a tank housing positioned within a discontinuity in a side rail of a frame of said vehicle, said discontinuity defining respective ends of said side rail, said tank housing having a pair of opposite ends and maintaining a plurality of pressure tanks therein;

channel members extending from said opposite ends of said tank housing and being securedly engaged to said respective ends of said side rail; and wherein said pressure tanks are cylindrical and fabricated from a fiber reinforced composite material.

13. The combination of a compressed gas fuel tank assembly and a vehicle according to claim 12, wherein said pressure tanks are nestingly received within said tank housing.

* * * * *